United States Patent [19]
Satoh et al.

[11] Patent Number: 5,379,319
[45] Date of Patent: Jan. 3, 1995

[54] TELEPHONE APPARATUS

[75] Inventors: Masaharu Satoh, Sagamihara; Akira Tajima, Yokohama, both of Japan

[73] Assignee: Matsushita Electric Industrial Co., Ltd., Osaka, Japan

[21] Appl. No.: 788,241

[22] Filed: Nov. 5, 1991

[30] Foreign Application Priority Data

Nov. 9, 1990 [JP] Japan .................................. 2-305132

[51] Int. Cl.6 .............................................. H04M 1/00
[52] U.S. Cl. ..................................... 379/387; 379/355; 379/61
[58] Field of Search ............... 379/387, 419, 422, 424, 379/453, 58, 61, 200, 210, 355

[56] References Cited

U.S. PATENT DOCUMENTS

| 4,441,143 | 4/1984 | Richardson et al. | 379/424 X |
| 4,932,050 | 6/1990 | Davidson et al. | 379/210 X |

FOREIGN PATENT DOCUMENTS

| 0153342 | 9/1984 | Japan | 379/61 |
| 0229432 | 11/1985 | Japan | 379/61 |
| 0242068 | 10/1991 | Japan . | |
| 0014916 | 1/1992 | Japan . | |
| 0241549 | 8/1992 | Japan . | |
| WO8808183 | 10/1988 | WIPO | 379/44 |

Primary Examiner—James L. Dwyer
Assistant Examiner—Magdy Shehata
Attorney, Agent, or Firm—Stevens, Davis, Miller & Mosher

[57] ABSTRACT

A telephone apparatus has a human body approach sensor for sensing, for example, infrared rays from a human body to produce an approach signal in response to which a controller activates a lamp to illuminate, for example, a ten-key device on the telephone, thereby facilitating the use of the telephone in darkness. When the sensor operation is continued longer than a predetermined period, the controller automatically triggers an automatic dialing function of the telephone.

2 Claims, 1 Drawing Sheet

TELEPHONE APPARATUS

BACKGROUND OF THE INVENTION

1. Field of the Invention

The present invention relates to a telephone apparatus suitable for use as, for example, a household telephone.

2. Description of the Related Art

In general, a telephone apparatus for household or other use has an auto-dialing function which automatically calls registered telephone numbers when an auto-dialing button is pushed followed by pushing of ten-key buttons corresponding to the registered codes. Usually, such telephone apparatuses have an illuminating light source for illuminating the ten-key buttons from the back side of the ten-key board, in order to facilitate the use of the telephone apparatus in darkness.

For instance, a lamp as the light source is automatically lit when the telephone is hooked-off as the user picks up the hand set or when a hook-off button or a speaker button is pressed by the user, thereby illuminating the ten-key board from the back side thereof. The auto-dialing function is put into effect as the user pushes the auto-dialing button after pushing the hook-off button or the speaker button, followed by pushing of ten-key buttons corresponding to the registered code.

The known telephone apparatus having the described illuminating system can meet the requirements for illumination of a ten-key board and auto-dialing function appreciably well, but still involves the following problems.

Namely, the known telephone apparatus of this kind, when used in darkness, is quite inconvenient in that the user can hardly recognize the positions of the hand set, the hook-off button and the speaker button. Furthermore, the use of the telephone apparatus in the auto-dialing mode is rather troublesome because the auto-dialing function does not become available unless the hook-off button or the speaker button is pushed before the auto-dialing button is pushed.

SUMMARY OF THE INVENTION

Accordingly, an object of the present invention is to provide a telephone apparatus in which an illumination function, as well as auto-dialing function, becomes operative when an approach of a human body to the telephone is sensed, thus enabling the user to fully enjoy the merits of the illuminating and auto-dialing functions, thus obviating the above-described shortcomings of the known art.

To this end, according to one aspect of the present invention, there is provided a telephone apparatus, comprising: a ten-key device for entering a telephone number of a station to be called; illuminating means for illuminating at least the ten-key device; human body approach sensing means which produces an approach signal when approached by a human body; and illumination control means for activating the illuminating means to illuminate the ten-key device in response to the approach signal.

According to another aspect of the present invention, there is provided a telephone apparatus, comprising: a ten-key device for enabling entry of a code and a telephone number; telephone number registration storage means for storing telephone numbers therein: calling means for transmitting one of the telephone numbers registered and stored in the telephone number registration storage means; human body approach sensing means which produces an approach signal when approached by a human body; read control means for enabling reading of a telephone number from the telephone number registration storage means in response to the approach signal; and call control means for activating the calling means in response to operation of the ten-key device in the presence of the approach signal.

In operation, the human body approach sensing means produces an approach signal upon sensing the approach of a human body, and the illumination control means activates the illuminating means upon receipt of the approach signal, thereby illuminating the ten-key buttons.

The approach of the user's body to the telephone apparatus is sensed by the human body approach sensing means which produces an approach signal, in response to which the read control means becomes operative to read the registered telephone numbers and call control means operates in response to a subsequent pushing of ten-key buttons corresponding to the registered code, whereby the user can call the registered telephone number.

DESCRIPTION OF THE PREFERRED EMBODIMENT

Figure 1:
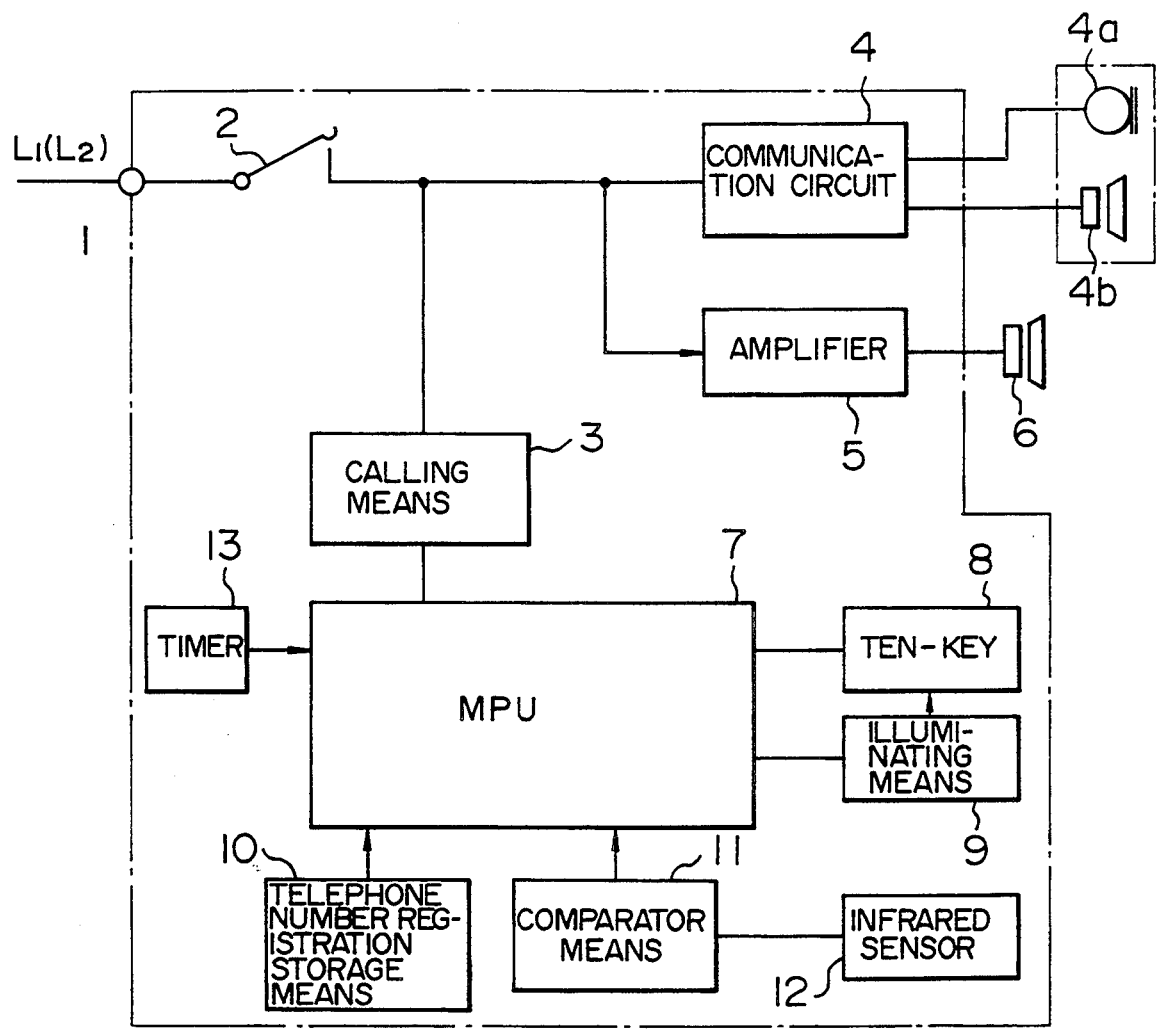
FIG. 1 is a block diagram of an embodiment of the present invention.

Referring to FIG. 1, a telephone apparatus embodying the present invention has line connection terminals 1 for connection to external telephone lines $L_1$, $L_2$, a hook switch 2 for opening and closing the telephone circuit including the lines $L_1$, $L_2$, a calling means 3 for transmitting an input telephone number to call a desired station, and a communication circuit 4 which is referred also as "speaker network" and which processes received signals and signals to be transmitted. The communication circuit 4 is connected to a microphone 4a as the voice input means and also to a receiver 4b. The telephone apparatus further has an amplifier 5 for amplifying the received signal, and a microprocessor (MPU) 7 which controls the operation of the whole telephone apparatus. To the microprocessor 7 are connected a ten-key device 8, an illuminating means 9 such as a lamp for illuminating the ten-key device from the back side thereof, and a telephone number registration storage means 10 such as RAM for storing telephone numbers registered for automatic dialing purpose. The telephone apparatus of the present invention has an infrared sensor 12 which serves as a human body approach sensor means which senses the approach of a human body to the telephone apparatus. In the illustrated embodiment, the infrared sensor 12 senses infrared rays irradiated from a human body, thereby producing an approach signal. A comparator 11 as comparing means compares the level of the approach signal output from the infrared sensor 12 with a predetermined reference level so as to determine whether the level of the approach signal is higher than the reference level. The comparator 11 also is connected to the microprocessor 7. The telephone apparatus further has a timer 13 which is activated by the microprocessor 7 when the latter has received an approach signal and which is cleared when a ten-key button 8 or other button is pushed. If no button is pushed before a time set on the timer 13 expires, the timer 13 delivers a timer-out signal to the microprocessor 7.

The operation of the described embodiment is as follows.

When a hand of a user who wishes to use the telephone in, for example, darkness approaches the infrared sensor 12, heat or infrared rays irradiated from the hand is sensed by the infrared sensor 12, so that the infrared sensor 12 produces an approach signal the level of which varies according to the distance between the hand and the infrared sensor 12. The approach signal thus obtained is delivered to the comparator 11 which compares the level of this approach signal with a predetermined reference level which has been set beforehand in conformity with the level of the infrared rays received when a hand has been brought to a position which is, for example, 50 cm from the telephone apparatus. The result of the comparison is delivered to the microprocessor 7. Thus, the microprocessor 7 determines that the user's hand has approached the telephone apparatus when the level of the approach signal has exceeded the reference level, and activates the illuminating means 9 to illuminate the keys or buttons on the ten-key device 8.

A description will now be given of the automatic dialing function. The user can beforehand register and store, in the telephone number registration storage means 10, telephone numbers to be called automatically. To this end, the user allocates suitable code numbers indicated by one, two or more of the ten keys 1 to 0 and, after suitably operating the ten-key device 8, inputs each code number by means of the ten-key device followed by inputting of the corresponding telephone number, whereby the telephone numbers together with the associated code numbers are inputted to the microprocessor 7 and registered and stored in the telephone number registration storage means 10.

For the purpose of an automatic call, the user's hand is brought close to the telephone apparatus so that the infrared sensor 12 in the telephone apparatus produces an approach signal of a level which varies according to the distance between the hand and the infrared sensor. The comparator 11 compares the level of the approach signal with the reference level which is set beforehand in accordance with the level of the infrared rays received when the hand is put at a position which is spaced a predetermined distance, e.g., 50 cm, from the infrared sensor. The comparator 11 then delivers the approach signal to the microprocessor 7 when the level of the approach signal has exceeded the reference level. As a consequence, the microprocessor determines that the hand of the user has been intentionally brought to the telephone apparatus and activators the illuminating means 9 thereby illuminating the ten-key device 8. At the same time, the microprocessor 7 activates the timer 13 so that the latter starts to measure time. If no operation is performed on the telephone apparatus before the time expires, the timer 13 delivers a timer-out signal to the microprocessor 7 so that the microprocessor 7 delivers an illumination-off signal, whereby the illuminating means 9 is turned off.

However, if a code number for a certain telephone number registered for automatic dialing is pushed before the time set in the timer 13 expires, the timer is cleared and the input code number is delivered to the microprocessor 7.

Upon receipt of the input code number, the microprocessor 7 reads the corresponding telephone number from the telephone number registration storage means 10 and closes the hook switch 2 while delivering the read telephone number to the calling means 3, thereby transmitting a call to the destined station through the external telephone line.

After a telephone conversation, the user puts the hand set on the telephone apparatus, in response to which the microprocessor unit 7 delivers the illumination-off signal 9 thereby turning off the illumination means 9.

As will be seen from the foregoing description, in the telephone apparatus of the present invention, an illuminating means is automatically turned on to illuminate the ten-key device in response to an approach signal produced when a portion of a human body, e.g., a user's hand, has approached the telephone apparatus, thus facilitating pickup of the hand set and recognition of the hook-off buttons and the speaker button. In addition, the approach of the user's body, e.g., a hand, triggers the operation of the automatic dialing function, so that the user can automatically call a station of a telephone number registered in the apparatus, simply by pushing a key corresponding to the code of the registered telephone number, without pushing a hook-off button or speaker button.

Although the invention has been described through its specific forms, it is to be understood that the described embodiment is only illustrative and may be changed or modified. For instance, the illuminating means may be arranged to illuminate not only the ten-key device but also other portions to be manipulated, e.g., hook-off button, auto-dialing button and so forth, although in the illustrated embodiment the illuminating means illuminates only the ten-key device 8.

Other changes and modifications are possible without departing from the scope of the invention which is limited solely by the appended claims.

What is claimed is:

1. A telephone apparatus, comprising:
   a ten-key device for enabling entry of a code and a telephone number;
   telephone number registration means for storing telephone numbers therein;
   calling means for transmitting one of the telephone numbers registered and stored in said telephone number registration storage means;
   human body approach sensing means for producing a signal when approached by a human body;
   a comparing means for comparing a value of said signal from said human body approach sensing means with a predetermined value, said comparing means delivering an approach signal when said value of said signal from said human body approach sensing means exceeds said predetermined value; and
   control means receiving said approach signal from said comparing means, for activating said telephone number registration means when said approach signal is delivered thereto, and for activating said calling means when said ten-key device is operated.

2. A telephone apparatus as set forth in claim 1, further comprising (a) illumination means for illuminating at least said ten-key device, and (b) a timer, and wherein said control means (i) activates said illuminating means to illuminate said ten-key device in response to said approach signal, and (ii) activates said timer when said control means receives said approach signal, said timer delivers a timer-out signal to said illumination means when a predetermined time period elapses after the timer is activated, and said control means de-activates said illumination means when it receives said timer-out signal from said timer, but de-activates said timer when the ten-key device is actuated before said predetermined time period elapses.

* * * * *